(12) United States Patent
Fukudome

(10) Patent No.: US 9,834,214 B2
(45) Date of Patent: Dec. 5, 2017

(54) VEHICLE

(71) Applicant: TOYOTA JIDOSHA KABUSHIKI KAISHA, Toyota-shi, Aichi (JP)

(72) Inventor: Hideki Fukudome, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/036,426

(22) PCT Filed: Nov. 19, 2014

(86) PCT No.: PCT/JP2014/005815
§ 371 (c)(1),
(2) Date: May 13, 2016

(87) PCT Pub. No.: WO2015/118590
PCT Pub. Date: Aug. 13, 2015

(65) Prior Publication Data
US 2016/0332625 A1 Nov. 17, 2016

(30) Foreign Application Priority Data

Feb. 5, 2014 (JP) ................. 2014-020157

(51) Int. Cl.
*B60L 9/00* (2006.01)
*B60L 11/00* (2006.01)
(Continued)

(52) U.S. Cl.
CPC .............. *B60W 30/18* (2013.01); *B60G 7/02* (2013.01); *B60G 17/02* (2013.01); *B60K 7/0007* (2013.01);
(Continued)

(58) Field of Classification Search
CPC ................................................... B60W 10/22
See application file for complete search history.

(56) References Cited

U.S. PATENT DOCUMENTS

2014/0284122 A1* 9/2014 Hirata ................ B60G 3/20
180/65.51

FOREIGN PATENT DOCUMENTS

| JP | 2007-099013 A | 4/2007 |
|----|---------------|--------|
| JP | 2013-095309 A | 5/2013 |

OTHER PUBLICATIONS

Shindo et al; "Development of the brake force control for improving Ride comfort" 2013; proceedings of Society of Automotive Engineers of Japan; pp. 1-4.

* cited by examiner

*Primary Examiner* — Imran Mustafa
(74) *Attorney, Agent, or Firm* — Oliff PLC

(57) ABSTRACT

A suspension characteristic is changed depending on a travel state by a simple structure. An ECU uses a vehicle speed-spring constant setting part to calculate a target spring constant depending on a vehicle speed, and uses a spring constant-frequency setting part to calculate a set frequency corresponding to the target spring constant. An oscillation input calculation part generates a signal representing an oscillation input oscillating at the set frequency. A superimposition part sets a value acquired by superimposing the oscillation input on a target driving force to a new target driving force. As a result, the wheel exhibits a minute oscillation in a longitudinal direction, resulting in an input of the minute oscillation to a suspension bush. The suspension bush changes in a spring constant and a damping coefficient depending on the frequency of the input minute oscillation. As a result, the suspension characteristic can be changed.

7 Claims, 9 Drawing Sheets

(51) Int. Cl.

| | |
|---|---|
| *G05D 1/00* | (2006.01) |
| *G05D 3/00* | (2006.01) |
| *G06F 7/00* | (2006.01) |
| *G06F 17/00* | (2006.01) |
| *B60W 30/18* | (2012.01) |
| *B60G 7/02* | (2006.01) |
| *B60G 17/02* | (2006.01) |
| *F16F 15/00* | (2006.01) |
| *F16F 1/38* | (2006.01) |
| *F16F 1/36* | (2006.01) |
| *B60K 7/00* | (2006.01) |
| *B60L 7/14* | (2006.01) |
| *B60L 11/18* | (2006.01) |
| *B60W 10/08* | (2006.01) |
| *B60W 10/22* | (2006.01) |

(52) U.S. Cl.
CPC ............. *B60L 7/14* (2013.01); *B60L 11/1803* (2013.01); *B60W 10/08* (2013.01); *B60W 10/22* (2013.01); *F16F 1/3615* (2013.01); *F16F 1/38* (2013.01); *F16F 15/002* (2013.01); *B60G 2202/42* (2013.01); *B60G 2204/143* (2013.01); *B60G 2204/30* (2013.01); *B60G 2204/41* (2013.01); *B60G 2300/50* (2013.01); *B60G 2400/204* (2013.01); *B60G 2400/206* (2013.01); *B60G 2400/91* (2013.01); *B60G 2500/20* (2013.01); *B60G 2500/22* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60W 2540/10* (2013.01); *B60W 2540/12* (2013.01); *B60W 2710/08* (2013.01); *B60W 2710/226* (2013.01); *F16F 2228/04* (2013.01); *F16F 2230/18* (2013.01); *Y02T 10/7258* (2013.01)

[Fig. 1]
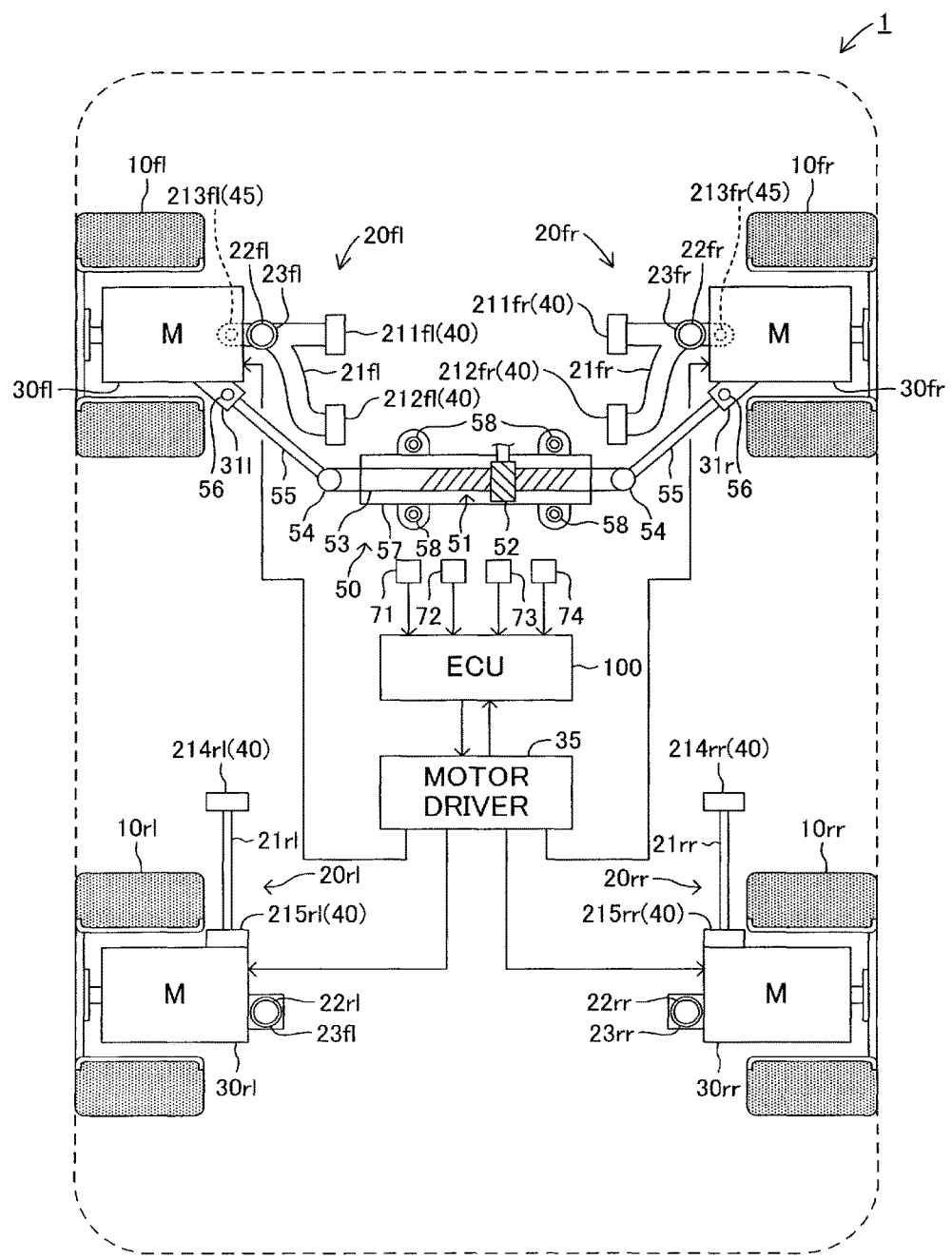

[Fig. 2]
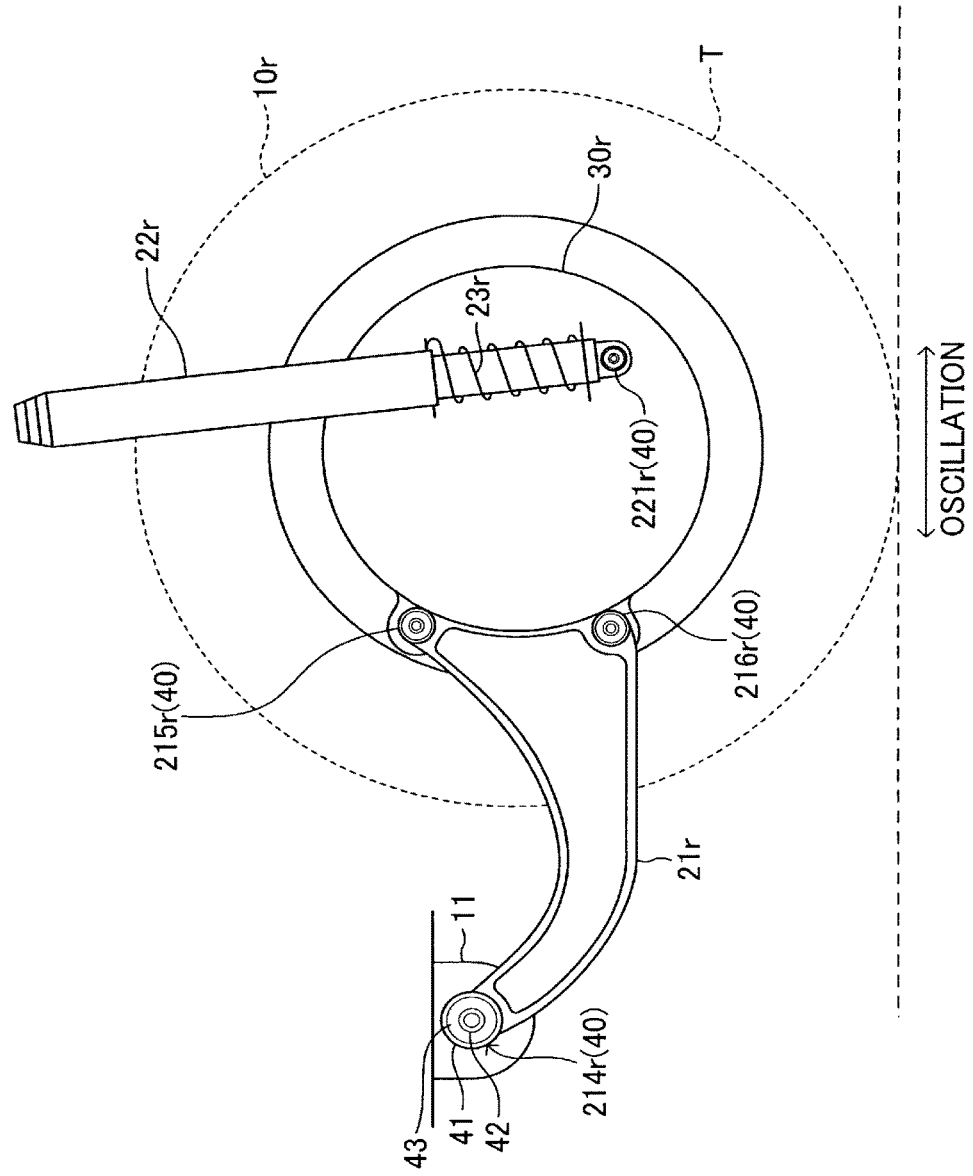

[Fig. 3]
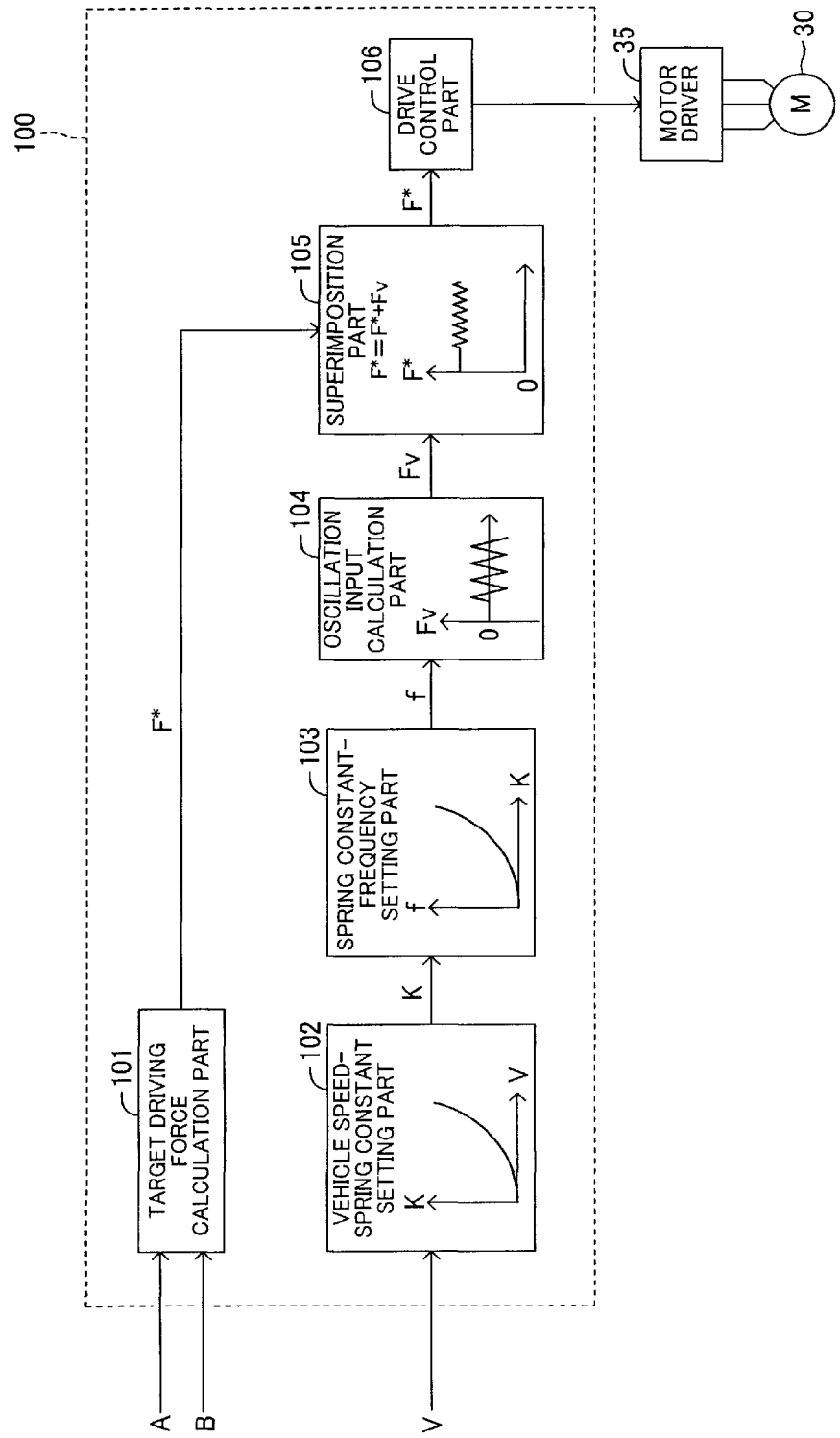

[Fig. 4]
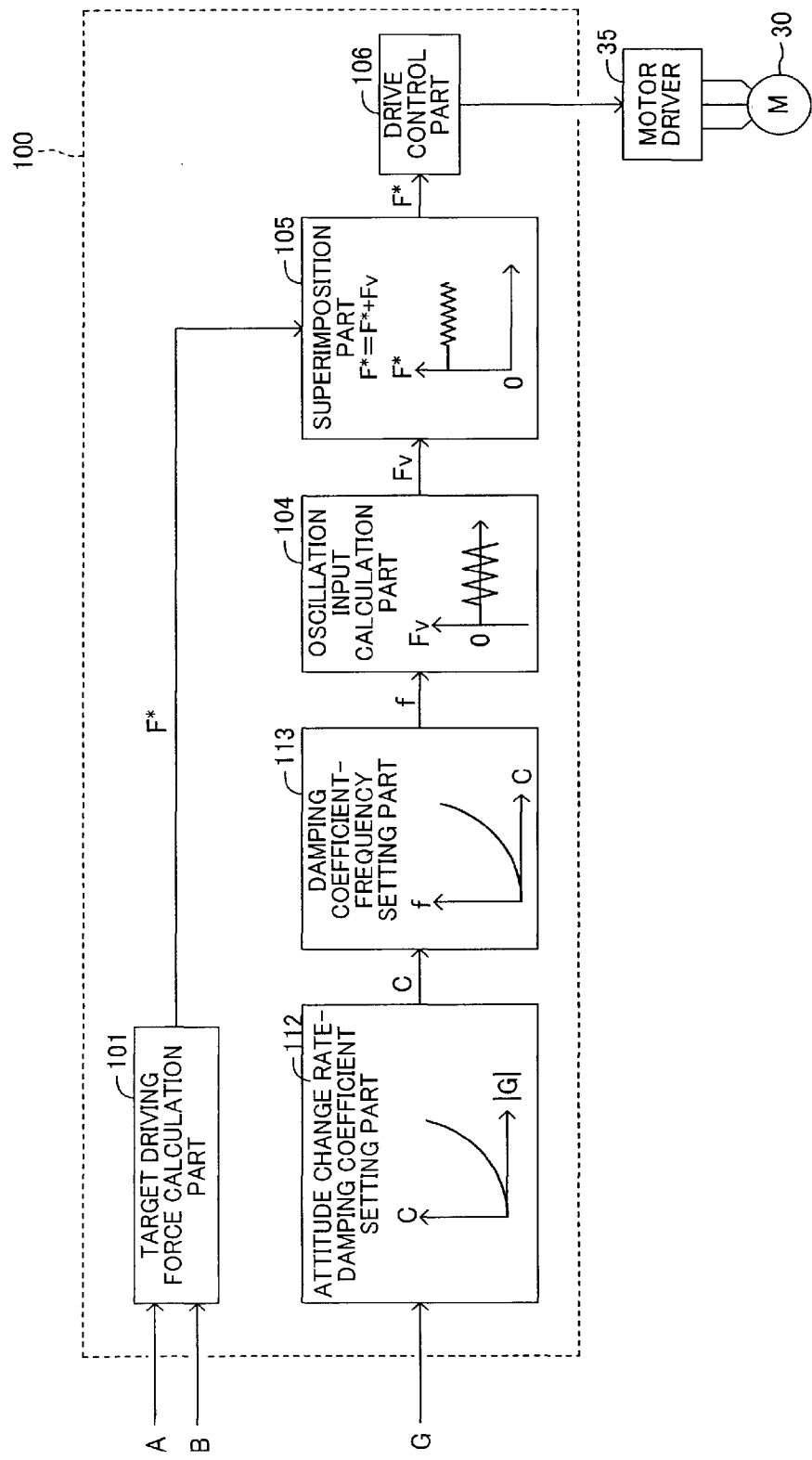

[Fig. 5]
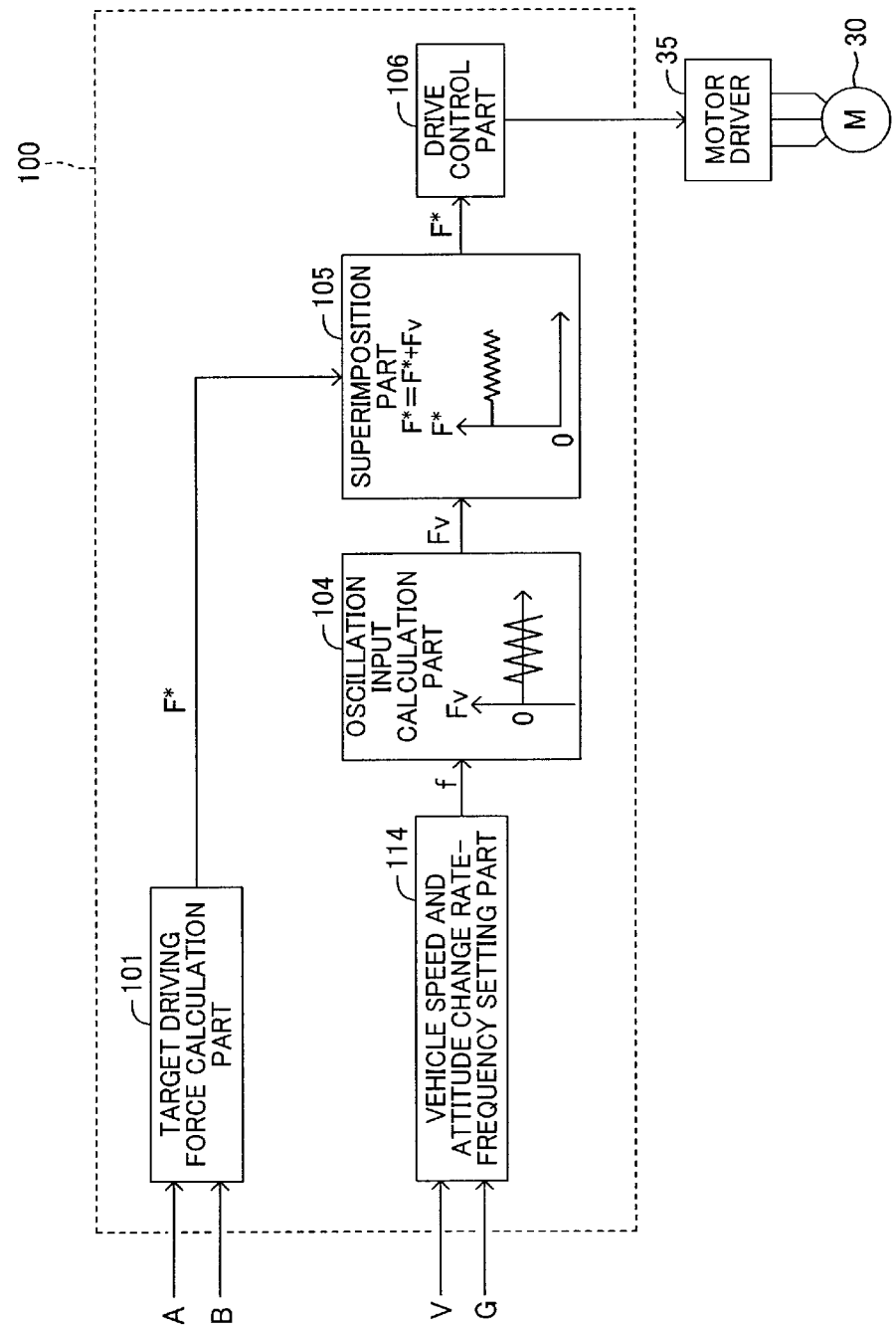

[Fig. 6]
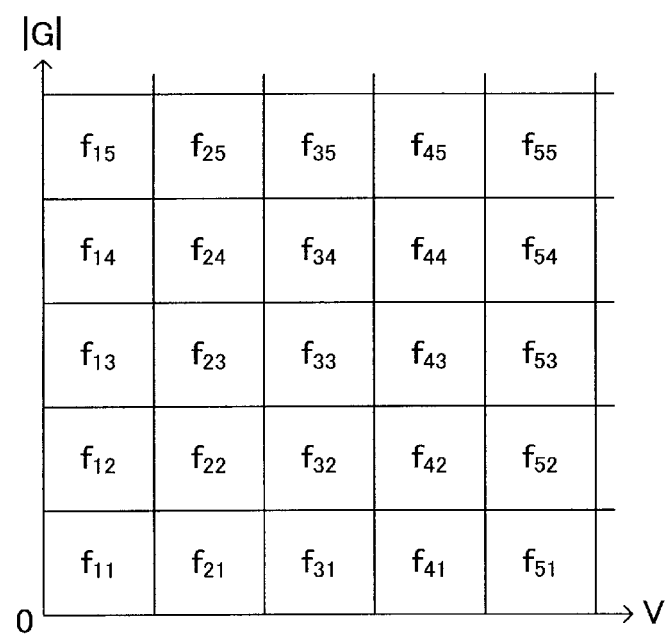

[Fig. 7]
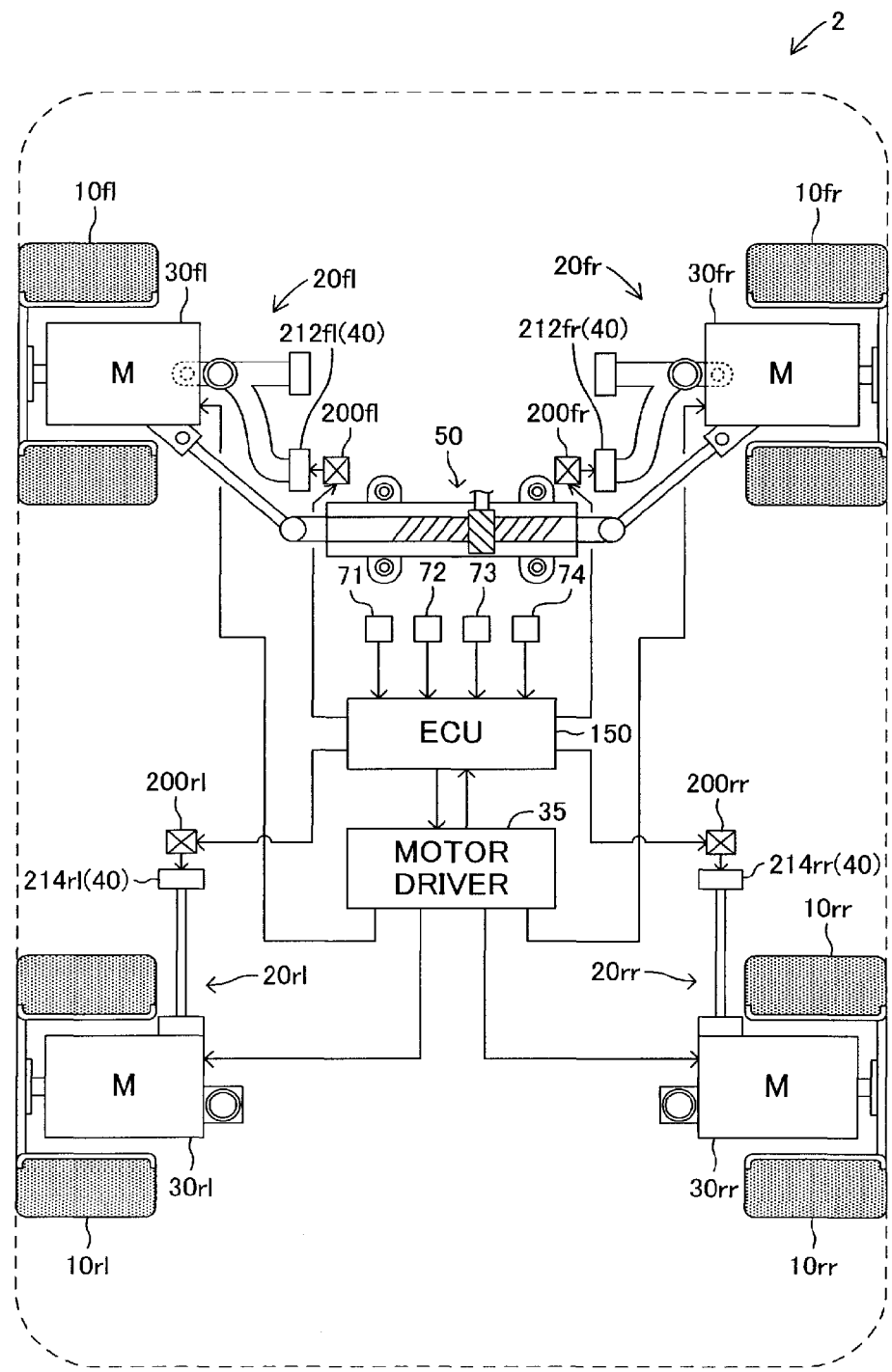

[Fig. 8]
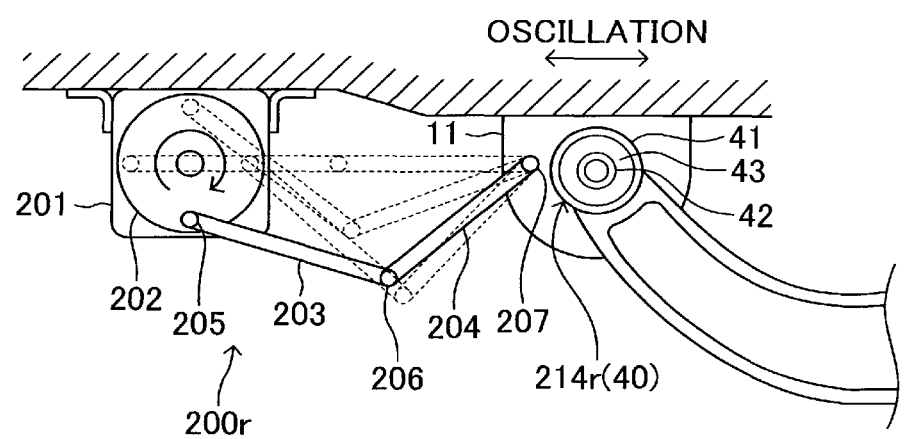

[Fig. 9]
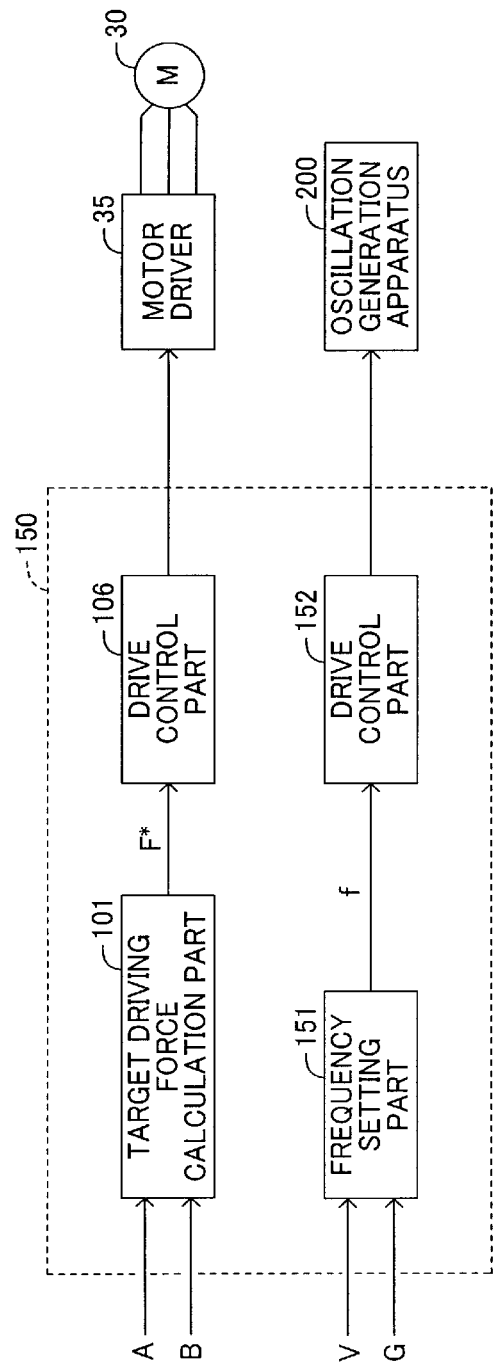

// VEHICLE

TECHNICAL FIELD

The present invention relates to a technology for changing a suspension characteristic of a vehicle depending on a travel state.

BACKGROUND ART

Hitherto, a vehicle which changes, depending on a travel state, a characteristic (referred to as suspension characteristic) of a suspension apparatus for coupling a wheel to a vehicle body has been known. The suspension characteristic is mainly determined by a spring constant and a damping coefficient of the suspension apparatus. Thus, ride comfort, operation stability, and the like can be changed by adjusting at least one of the spring constant or the damping coefficient depending on the travel state. For example, Patent Literature 1 proposes a suspension system configured to eliminate an oscillation specific to a vehicle of an in-wheel motor driving type. The suspension system includes air springs each capable of changing a spring constant and shock absorbers each capable of changing a damping coefficient, and changes, when the number of revolutions of a motor enters a specific range, the spring constants of the air springs and the damping coefficients of the shock absorbers to reduce the oscillation of the vehicle.

CITATION LIST

Patent Literature

[PTL 1] JP 2013-95309 A

SUMMARY OF INVENTION

However, the proposed technology requires installation of both the air springs each capable of changing the spring constant and the shock absorbers each capable of changing the damping coefficient, and a configuration thereof is complex.

The present invention has been made in view of the above-mentioned problem, and therefore has an object to use a simple configuration to change the suspension characteristic depending on the travel state.

In order to achieve the above-mentioned object, one feature according to one embodiment of the present invention resides in a vehicle, including:

travel state amount acquisition means (73, 74) for acquiring a travel state amount that is a state amount relating to a travel state of the vehicle;

oscillation applying means (30, 200) for applying an oscillation for changing a characteristic of a suspension rubber bush (40) to the suspension rubber bush;

frequency setting means (102, 103, 112, 113, 114, 151) for setting, based on the travel state amount acquired by the travel state amount acquisition means, a frequency of the oscillation to be applied to the suspension rubber bush; and oscillation control means (104, 105, 152) for controlling an operation of the oscillation applying means so as to apply the oscillation at the frequency set by the frequency setting means to the suspension rubber bush.

A wheel for a travel of the vehicle is suspended from a vehicle body by a suspension apparatus. The suspension apparatus generally includes a suspension arm (link mechanism), a suspension spring interposed between the wheel and the vehicle body, for supporting the vehicle body and absorbing a shock, and a shock absorber for damping an oscillation of the suspension spring. The suspension characteristic is mainly determined by these components. Moreover, a suspension rubber bush for absorbing a shock transmitted from the wheel to the vehicle body is interposed for the components constructing the suspension apparatus, mainly the suspension arm. Thus, according to one embodiment of the present invention, the suspension rubber bush constitutes an element of determining the suspension characteristic. The suspension characteristic can be changed by actively changing characteristics of the suspension rubber bush.

The inventor of the present invention has acquired such knowledge that the characteristics of the suspension rubber bush change depending on a frequency of an oscillation input to the suspension rubber bush as a result of various tests. The test result shows that the spring constant of the suspension rubber bush increases as the frequency of the input oscillation increases. Moreover, the damping coefficient of the suspension rubber bush also increases as the frequency of the input oscillation increases. Thus, the characteristics of the suspension rubber bush can be adjusted by inputting the oscillation to the suspension rubber bush, and controlling the frequency of the oscillation. According to one embodiment of the present invention, the suspension characteristic is changed by inputting an oscillation having a predetermined amplitude to the suspension rubber bush, and controlling the frequency of the input oscillation.

Therefore, according to one embodiment of the present invention, the vehicle includes the travel state amount acquisition means, the oscillation applying means, the frequency setting means, and the oscillation control means. The travel state amount acquisition means acquires the travel state amount that is the state amount relating to the travel state of the vehicle. For example, at least one of a vehicle speed, which is a speed of the vehicle body, or accelerations of the vehicle body (longitudinal acceleration, lateral acceleration, vertical acceleration, yaw rate, roll rate, pitch rate, and the like) can be used as the travel state amount. The oscillation applying means applies an oscillation for changing the characteristics of the suspension rubber bush to the suspension rubber bush. Thus, the characteristics (spring constant and damping coefficient) of the suspension rubber bush can be changed by applying the oscillation. The frequency setting means sets, based on the travel state amount acquired by the travel state amount acquisition means, the frequency of the oscillation to be applied to the suspension rubber bush. The oscillation control means controls the operation of the oscillation applying means so as to apply the oscillation at the frequency set by the frequency setting means to the suspension rubber bush. As a result, the oscillation at the frequency corresponding to the travel state can be applied to the suspension rubber bush.

The characteristics (the spring constant and the damping coefficient) of the suspension rubber bush change depending on the frequency of the applied oscillation. Thus, the characteristics of the suspension rubber bush can be adjusted depending on the travel state. As a result, according to one embodiment of the present invention, the suspension characteristics can be adjusted by such a simple configuration that the oscillation at the frequency corresponding to the travel state is applied to the suspension rubber bush. As a result, at least one of the ride comfort or the operation stability can be increased by the simple configuration.

It should be noted that the present invention does not exclude a vehicle including suspension springs variable in spring constant, or shock absorbers variable in damping coefficient. This is because the change of the suspension characteristic can be easily assisted by changing the characteristic of the suspension rubber bush even on the vehicle including suspension springs variable in spring constant, or shock absorbers variable in damping coefficient. Moreover, a change in the suspension characteristic in areas not suited to the suspension spring or the shock absorber can be assisted by the suspension rubber bush. For example, the suspension rubber bush is more efficient in damping characteristic than the shock absorber in a minute stroke area where the shock absorber starts stroking. Thus, at least one of the ride comfort or the operation stability can be easily increased by changing the damping coefficient of the suspension rubber bush depending on the travel state.

According to one aspect of the present invention, the oscillation applying means is a motor (30) built into a wheel of the vehicle, for generating a driving force for rotating the wheel, and the oscillation control means is motor control means (100) for oscillating the driving force at the frequency set by the frequency setting means.

The motor is built into the wheel, and the wheel is rotated by the driving force of the motor according to one aspect of the present invention. The motor control means controls the driving force of the motor, thereby controlling the travel of the vehicle. Thus, the present invention is applied to a vehicle of an in-wheel motor driving type. According to one embodiment of the present invention, the motor servers as the oscillation applying means for applying the oscillation to the suspension rubber bush. Therefore, the motor control means oscillates the driving force of the motor at the frequency set by the frequency setting means. When the driving force of the motor is oscillated, the rotational speed of the wheel oscillates. As a result, the suspension components such as the suspension arm oscillate in the longitudinal direction of the vehicle, and the oscillation is applied to the suspension rubber bush. Thus, the motor and the motor control means, which are originally installed on the vehicle of the in-wheel motor driving type, can be used to apply the oscillation at the desired frequency to the suspension rubber bush. As a result, the suspension characteristic can be adjusted by the simpler configuration.

According to one aspect of the present invention, the motor control means is configured to determine a target driving force (F*) for the motor depending on a driver operation amount (101), superimpose an oscillation component (Fv) at the set frequency on the determined target driving force to determine a final target driving force (104, 105), and control the driving force based on the final target driving force.

According to one aspect of the present invention, the motor control means determines the target driving force for the motor depending on the driver operation amount. For example, the motor control means determines the target driving force depending on an accelerator operation amount. Further, the motor control means superimposes the oscillation component at the frequency set by the frequency setting means on the target driving force, thereby determining the final target driving force. As a result, the final target driving force includes the oscillation component. Thus, when the motor control means controls the driving force for the motor based on the target driving force, the rotation of the wheel includes the oscillation component at the frequency. As a result, the suspension components such as the suspension arm oscillate in the longitudinal direction of the vehicle, and the oscillation is applied to the suspension rubber bush.

Thus, according to one embodiment of the present invention, the driving force for the motor can be simply and appropriately oscillated during the travel of the vehicle.

According to one aspect of the present invention, the travel state amount acquisition means acquires a vehicle speed (V) as the travel state amount, and the frequency setting means (102, 103) sets, when the vehicle speed is high, the frequency to a higher value than when the vehicle speed is low.

In this case, it is preferred that the frequency setting means set, as the frequency, such a frequency that a spring constant of the suspension rubber bush is a target spring constant set depending on the vehicle speed.

It is preferred that the ride comfort be focused and the suspension characteristic be softened during a travel at an ordinary vehicle speed, and the operation stability be focused and the suspension characteristic be hardened during a travel at a high speed. Thus, at a high vehicle speed, the frequency of the oscillation to be applied to the suspension rubber bush is increased to be higher than that at a low vehicle speed according to one aspect of the present invention. For example, when the vehicle speed is a first vehicle speed, the frequency is set to a value higher than that at a second vehicle speed lower than the first vehicle speed. As a result, the spring constant (rigidity) of the suspension rubber bush increases at the high speed travel, resulting in the increase in the operation stability. Moreover, during the travel at the ordinary vehicle speed, the spring constant of the suspension rubber bush decreases, and the shock input from the wheel is appropriately absorbed, resulting in the increase in the ride comfort.

A resonance frequency of the vehicle body is changed by changing the spring constant. Moreover, in general, a frequency of a vehicle body oscillation which the driver feels uncomfortable changes depending on the vehicle speed. Thus, according to one aspect of the present invention, the travel state amount acquisition means acquires the vehicle speed as the travel state amount, and the frequency setting means sets such a frequency that the spring constant of the suspension rubber bush is the target spring constant set depending on the vehicle speed as the frequency of the oscillation to be applied to the suspension rubber bush. Thus, the resonance frequency of the vehicle body can be changed so as to be separated from the frequency band of the oscillation which the driver feels uncomfortable. As a result, the ride comfort can be increased.

According to one aspect of the present invention, the travel state amount acquisition means acquires an attitude change rate (G) of a vehicle body of the vehicle as the travel state amount, and the frequency setting means (112, 113) sets, when a magnitude of the attitude change rate is large, the frequency to a higher value than when the magnitude of the attitude change rate is small.

In this case, it is preferred that the frequency setting means set, as the frequency, such a frequency that a damping coefficient of the suspension rubber bush is a target damping coefficient set depending on the attitude change rate of the vehicle body.

When an attitude of the vehicle body greatly changes, for example, when the vehicle body is turning, when the vehicle body is vertically oscillating, when the vehicle body is rolling, or when the vehicle body is pitching, there is such a request as to quickly stabilize the attitude of the vehicle body. Thus, according to one aspect of the present invention, the travel state amount acquisition means acquires the attitude change rate of the vehicle body of the vehicle. The attitude change rate of the vehicle can be acquired by detecting the acceleration (second order derivative of the vehicle body position: longitudinal acceleration, lateral acceleration, vertical acceleration, yaw rate, pitch rate, roll rate, or the like) of the vehicle body.

Then, when a magnitude of the attitude change rate is large, the frequency setting means sets the frequency to a value higher than a value when the magnitude of the attitude change rate is small. For example, when a magnitude of the attitude change rate is a first magnitude, the frequency is set to a value more than that in a case when the magnitude of the attitude change rate is a second magnitude less than the first magnitude. As a result, when the attitude of the vehicle body greatly changes, the damping coefficient of the suspension rubber bush can be increased, and an oscillation level (amplitude) of the vehicle body can be reduced.

As a result, the attitude of the vehicle body can be stabilized to increase the operation stability. Moreover, when the attitude of the vehicle body does not greatly change, the damping coefficient of the suspension rubber bush can be reduced, resulting in an increase in ride comfort while an oscillation of the vehicle body at an appropriate degree is permitted. In this case, when such a frequency that the damping coefficient of the suspension rubber bush is the target damping coefficient set depending on the attitude change rate of the vehicle body is set as the frequency of the oscillation to be applied to the suspension rubber bush, the excellent ride comfort and operation stability can be simultaneously realized more excellently.

In the description above, reference symbols used in embodiments are enclosed in parentheses, and are assigned to each configuration of the invention corresponding to the embodiments in order to more readily understand the invention, but each component of the invention is not limited to the embodiments prescribed by the reference symbol.

BRIEF DESCRIPTION OF DRAWINGS

FIG. 1 is a schematic configuration diagram of a vehicle according to a first embodiment of the present invention.

FIG. 2 is a schematic configuration diagram illustrating a suspension of a rear wheel.

FIG. 3 is a functional block diagram illustrating first motor control processing according to the first embodiment.

FIG. 4 is a functional block diagram illustrating second motor control processing according to the first embodiment.

FIG. 5 is a functional block diagram illustrating third motor control processing according to the first embodiment.

FIG. 6 is a frequency setting map relating to a third motor control example.

FIG. 7 is a schematic configuration diagram of a vehicle according to a second embodiment of the present invention.

FIG. 8 is a schematic configuration diagram of an oscillation generation apparatus according to the second embodiment.

FIG. 9 is a functional block diagram illustrating oscillation control processing according to the second embodiment.

DESCRIPTION OF EMBODIMENTS

A detailed description is now given of embodiments of the present invention referring to the drawings. FIG. 1 schematically illustrates a configuration of a vehicle 1 of an in-wheel motor driving type according to a first embodiment of the present invention.

The vehicle 1 includes a front left wheel 10*fl*, a front right wheel 10*fr*, a rear left wheel 10*rl*, and a rear right wheel 10*rr*. In the following, when a wheel does not need to be identified as which of the front left wheel 10*fl*, the front right wheel 10*fr*, the rear left wheel 10*rl*, and the rear right wheel 10*rr*, the wheel is simply referred to as wheel 10. Moreover, when a wheel does not need to be identified as which of the front left wheel 10*fl* and the front right wheel 10*fr*, the wheel is referred to as front wheel 10*f*, and when a wheel does not need to be identified as which of the rear left wheel 10*rl* and the rear right wheel 10*rr*, the wheel is referred to as rear wheel 10*r*. Similarly, for a component described later and provided in correspondence to the front left wheel 10*fl*, "fl" is added to an end of reference numeral thereof, for a component provided in correspondence to the front right wheel 10*fr*, "fr" is added to an end of reference numeral thereof, for a component provided in correspondence to the rear left wheel 10*rl*, "rl" is added to an end of reference numeral thereof, for a component provided in correspondence to the rear right wheel 10*rr*, "rr" is added to an end of reference numeral thereof, and when a component does not need to be identified as which of the front left and right and rear left and right wheels the component corresponds to, the end of the reference numeral is herein omitted. Moreover, when a component is provided for the front left wheel 10*fl* or the front right wheel 10*fr*, and does not need to be identified as which of the front left wheel fl and the front right wheel 10*fr* the component is provided for, "l" or "r" of the end of the reference numeral is herein omitted, and when a component is provided for the rear left wheel 10*rl* or the rear right wheel 10*rr*, and does not need to be identified as which of the rear left wheel 10*rl* and the rear right wheel 10*rr* the component is provided for, "l" or "r" of the end of the reference numeral is herein omitted.

Motors 30*fl*, 30*fr*, 30*rl*, and 30*rr* are respectively built inside the front left wheel 10*fl*, the front right wheel 10*fr*, the rear left wheel 10*rl*, and the rear right wheel 10*rr*. Each of the motors 30 is a so-called in-wheel motor, includes speed reduction gears (not shown) inside a casing, and transmits a motor torque via the speed reduction gears to each of the wheels 10. A driving force or a braking force to be generated on the respective wheels 10 can be independently controlled by independently controlling rotations of the respective motors 30 on the vehicle 1.

The front left wheel 10*fl*, the front right wheel 10*fr*, the rear left wheel 10*rl*, and the rear right wheel 10*rr* are suspended via independent suspensions 20*fl*, 20*fr*, 20*rl*, and 20*rr* from the vehicle body. The suspension 20 may be of any type. On this occasion, a description is given of such a vehicle, as an example, that the suspensions 20*f* on the front wheel side are of the double wishbone type, and the suspensions 20*r* on the rear wheel side are of the trailing arm type.

The suspension 20 couples the motor 30 (the casing of the motor 30) to the vehicle body, thereby supporting the wheel 10 for rotation. The motor 30 herein includes not only a functional part for generating the torque, but also the speed reduction gears and the casing for storing them.

The suspension 20*r* on the rear wheel side includes a suspension arm 21*r*, a shock absorber 22*r*, and a suspension spring 23*r*. As illustrated in FIG. 2, the suspension arm 21*r* is a trailing arm for coupling the motor 30*r* to the vehicle body, and is aligned in the vehicle longitudinal direction. The suspension arm 21*r* includes a vehicle body coupling part 214*r* on an end on the vehicle front side, and an upper motor coupling part 215*r* and a lower motor coupling part 216*r* on ends on the vehicle rear side. The suspension arm 21*r* is coupled via the vehicle body coupling part 214*r* to a bracket 11, which is a vehicle body-side member, and is coupled to the motor 30*r* via the upper motor coupling part 215*r* and the lower motor coupling part 216*r*. The vehicle body coupling part 214*r*, the upper motor coupling part 215*r*, and the lower motor coupling part 216*r* are each constructed by a suspension rubber bush 40 (hereinafter referred to as suspension bush 40). Thus, the suspension arm 21*r* couples via the suspension bushes 40 the vehicle body and the motor 30*r* to each other.

For example, as illustrated at the vehicle body coupling part 214*r* in FIG. 2, the suspension bush 40 includes a metal outer cylinder 41, a metal inner cylinder 42, and rubber 43, which is an elastic member inserted between the outer cylinder 41 and the inner cylinder 42. The suspension bush 40 absorbs a shock transmitted from the suspension arm 21*r* to the vehicle body. For example, the outer cylinder 41 of the suspension bush 40 constructing the vehicle body coupling part 214*r* is welded to the suspension arm 21*r*, and the inner cylinder 42 is fixed to the bracket 11 by threadedly engaging a nut (not shown) with a bolt (not shown) inserted into the inner cylinder 42 while both ends of the inner cylinder 42 are clamped by the bracket 11. Details of structures of the suspension bushes 40 in the suspension 20*r* are specific to the respective coupling parts 214*r*, 215*r*, and 216*r*. Various coupling structures are publicly known as the coupling structure for coupling the two members to each other via the suspension bush 40, and these publicly-known technologies may be appropriately applied. Moreover, a structure for coupling the suspension bush 40 is not shown in the drawings.

A lower end part of the shock absorber 22*r* is coupled via a lower portion coupling part 221*r* to the motor 30*r*, and an upper end part thereof is coupled via an upper support (not shown) to the vehicle body. The lower portion coupling part 221*r* is constructed by the suspension bush 40. The shock absorber 22*r* is of a type without a function of changing a damping coefficient, but may be of a type variable in damping coefficient. The suspension spring 23*r* is a coil spring, and is provided in a manner concentric with the shock absorber 22*r*. The suspension spring 23*r* is interposed between the rear wheel 10*r* and the vehicle body to support the vehicle body, and to absorb a shock. The shock absorber 22*r* damps an oscillation of the suspension spring 23*r*, namely, a vertical relative motion between the rear wheel 10*r* and the vehicle body.

The suspension 20*f* on the front wheel side includes a suspension arm 21*f*, a shock absorber 22*f*, and a suspension spring 23*f*. The suspension arm 21*f* includes a lower arm provided on a lower stage and an upper arm provided on an upper stage, but only the lower arm is shown as a representative in the drawing. The lower arm and the upper arm are vertically different in a position coupled to the motor 30 and a position coupled to the vehicle body, but are common in a shape and a coupling form, and a description is now given of the lower arm as a description of the suspension arm 21*f*.

The suspension arm 21*f* is formed into an L shape, and includes a front coupling part 211*f*, a rear coupling part 212*f*, and a motor coupling part 213*f*. The suspension arm 21*f* is coupled via the front coupling part 211*f* and the rear coupling part 212*f* to the vehicle body, and is coupled via the motor coupling part 213*f* to the motor 30*f*. The front coupling part 211*f* and the rear coupling part 212*f* are constructed by the suspension bushes 40. Thus, the suspension arm 21*f* is coupled via the suspension bushes 40 to the vehicle body. The motor coupling part 213*f* is constructed by a ball joint 45. Thus, the suspension arm 21*f* is coupled via the ball joint 45 to the casing of the motor 30*f*. The structures of the suspension bushes 40 in the suspension 20*f* are specific to the respective coupling parts 211*f* and 212*f*. The suspension bushes 40 constructing the front coupling part 211*f* and the rear coupling part 212*f* according to this embodiment are arranged so that axial directions thereof are aligned with the vehicle longitudinal direction, but the directions thereof are not always aligned with this direction, and may be aligned with the vertical direction or the vehicle lateral direction.

A lower end part of the shock absorber 22*f* is coupled via a suspension bush (not shown) to the suspension arm 21*f* (upper surface of the lower arm), and an upper end part thereof is coupled to the vehicle body. The shock absorber 22*f* is of a type without a function of changing a damping coefficient, but may be of a type variable in damping coefficient. The suspension spring 23*f* is a coil spring, and is provided in a manner concentric with the shock absorber 22*f*. The suspension spring 23*f* is interposed between the front wheel 10*f* and the vehicle body to support the vehicle body, and to absorb a shock. The shock absorber 22*f* damps an oscillation of the suspension spring 23*f*, namely, a vertical relative motion between the front wheel 10*f* and the vehicle body.

Moreover, the front left wheel 10*fl* and the front right wheel 10*fr* can be steered by a steering apparatus 50 of the steer-by-wire type. The steering apparatus 50 includes a rack-and-pinion mechanism 51, and uses a steering motor (not shown) to rotate a pinion gear 52, thereby linearly moving a rack bar 53 in an axial direction. Base ends of tie rods 55 are coupled respectively via ball joints 54 to both ends of the rack bar 53. Distal ends of the respective tie rods 55 are coupled via ball joints 56 to knuckle arms 31 provided on the casings of the motors 30. The rack-and-pinion mechanism 51 is stored in a rack housing 57. The rack housing 57 is fixed via rubber bushes 58 to the vehicle body.

For example, brushless motors are used as the respective motors 30. The respective motors 30 are connected to a motor driver 35. The motor driver 35 includes, for example, inverters, and four sets of inverters are provided for the respective motors 30. The motor driver 35 converts DC power supplied from a battery (not shown) into AC power, and independently supplies the AC power to the respective motors 30. As a result, the driving of the respective motors 30 is controlled to generate torques to apply the driving forces to the respective wheels 10.

Moreover, each motor 30 also functions as an electric power generator, for generating electric power from rotational energy of each wheel 10, and recharging the battery with the generated electric power via the motor driver 35. The braking torque generated by the electric power generation of the motor 30 applies the braking force to the wheel 10. A brake apparatus is provided for each wheel 10, but does not directly relate to the present invention, and a description and illustration thereof are therefore omitted.

The motor driver 35 is connected to an electronic control unit 100. The electronic control unit 100 (hereinafter referred to as ECU 100) includes a microcomputer including a CPU, a ROM, and a RAM as a main component, and executes various programs to independently control the operations of the individual motors 30. The ECU 100 connects to an accelerator sensor 71, a brake sensor 72, a vehicle speed sensor 73, and an acceleration sensor 74, and inputs detection signals output from the respective sensors.

The accelerator sensor 71 detects an accelerator operation amount A by the driver from a depressed amount (or an angle or a pressure) of an accelerator pedal, and outputs a detection signal representing the accelerator operation amount A. The brake sensor 72 detects a brake operation amount B by the driver from a depressed amount (or an angle or a pressure) of a brake pedal, and outputs a detection signal representing the brake operation amount B. The vehicle speed sensor 73 detects a speed of the vehicle body, namely, a vehicle speed V, and outputs a detection signal representing the vehicle speed V. The acceleration sensor 74 (hereinafter referred to as G sensor 74) detects an attitude change rate G of the vehicle body, namely, a state amount corresponding to the second order derivative of the vehicle position, and outputs a detection signal representing the attitude change rate G.

For example, a lateral acceleration sensor for detecting an acceleration in the lateral direction of the vehicle body, a longitudinal acceleration sensor for detecting an acceleration in the longitudinal direction of the vehicle body, a vertical acceleration sensor for detecting an acceleration in the vertical direction of the vehicle body, a yaw rate sensor for detecting an acceleration in the yaw direction of the vehicle body, a pitch rate sensor for detecting an acceleration in the pitch direction of the vehicle body, and a roll rate sensor for detecting an acceleration in a roll direction of the vehicle body may be used as the G sensor 74. One or an arbitrary combination of the plurality of sensors is provided as the G sensor 74. A sign of the sensor detection value including a directional factor identifies the direction thereof, but when the magnitude thereof is discussed, an absolute value thereof is used.

First Motor Control Example

A description is now given of motor control processing carried out by the ECU 100. A description is given of three examples of the motor control processing. FIG. 3 is a functional block diagram of the ECU 100 according to a first motor control example. Processing by respective functional parts is repeated at a predetermined short calculation cycle by the microcomputer of the ECU 100.

The ECU 100 includes a target driving force calculation part 101. The target driving force calculation part 101 calculates a target driving force F* of the motor 30 based on the accelerator operation amount A detected by the accelerator sensor 71. The target driving force calculation part 101 stores association data such as a map for deriving the target driving force F* from the accelerator operation amount A, and uses the association data to calculate the target driving force F*. For example, the target driving force F* is determined to such a value as to increase as the accelerator operation amount A (such as an accelerator opening degree) increases. In this case, the vehicle speed V may be considered, and the target driving force may be corrected so as to decrease as the vehicle speed V increases.

Moreover, when the brake operation is detected by the brake sensor 72, the target driving force calculation part 101 calculates a target braking force F* (negative target driving force F*). The target driving force calculation part 101 stores association data such as a map for deriving the target braking force F* from the brake operation amount B, and uses the association data to calculate the target braking force F*. If a regeneration braking force which can be generated by the motor 30 is less than the target braking force F*, a braking force corresponding to an insufficient amount is added by a friction brake apparatus (not shown).

Such a configuration that the braking force is generated only by the friction brake apparatus without generating the regeneration braking force during the brake operation may be provided. The braking force can be considered as a negative driving force, and hence the driving force (a force in a direction for increasing the rotational speed of the wheel 10) and the braking force (a force in a direction for decreasing the rotational speed of the wheel 10) are hereinafter not distinguished from each other, and both of them are expressed as "driving force" herein.

The vehicle according to this embodiment changes the characteristics (the spring constant and the damping coefficient) of the suspension bushes 40 provided on the suspensions 20 to change the suspension characteristic. The inventor of the present invention has acquired such knowledge that the characteristic of the suspension bush 40 changes depending on a frequency of an oscillation input to the suspension bush 40 as a result of various tests. The spring constant of the suspension bush 40 increases as the frequency of the input oscillation increases based on the test result. Moreover, the damping coefficient of the suspension bush 40 also increases as the frequency of the input oscillation increases. Moreover, the changes in the characteristics are not generated only for a suspension bush 40 having a specific shape or a specific structure. This is because the rubber itself, which is the elastic material of the suspension bush 40, has such a frequency characteristic that the rubber hardens when an oscillation at a high frequency is input. Thus, the characteristics of a general-purpose suspension bush can be adjusted. The characteristics of the suspension bush 40 change when the frequency of the input oscillation is changed in a range, for example, from tens of Hz to 100 Hz.

Thus, in this embodiment, a minute oscillation (having a minute amplitude) is input to the suspension bushes 40, and the characteristics of the suspension bushes 40 are adjusted by controlling the frequency of the oscillation, thereby increasing the ride comfort and the operation stability. In this case, the minute oscillation is input to the suspension bush 40 by oscillating the driving torque generated by the motor 30. The plurality of suspension bushes 40 are provided on the suspension 20, but sufficient oscillations do not always need to be input to all the suspension bushes 40, and the driving torque of the motor 30 only need to be oscillated so that the characteristics of the suspension bushes 40 recognized as a whole on each of the suspensions 20 are changed by the oscillation inputs. Therefore, the ECU 100 includes the following configuration for correcting the target driving force F* calculated by the target driving force calculation part 101.

The ECU 100 includes, in addition to the target driving force calculation part 101, a vehicle speed-spring constant setting part 102, a spring constant-frequency setting part 103, an oscillation input calculation part 104, a superimposition part 105, and a drive control part 106.

The vehicle speed-spring constant setting part 102 stores a spring constant setting map. As illustrated in a block in FIG. 3, the spring constant setting map sets a relationship between the vehicle speed V and a target spring constant K. The spring constant setting map has such a characteristic that the target spring constant K increases as the vehicle speed V increases. The vehicle speed-spring constant setting part 102 inputs the vehicle speed V detected by the vehicle speed sensor, refers to the spring constant setting map to calculate the target spring constant K corresponding to the detected vehicle speed V, and supplies the calculation result (target spring constant K) to the spring constant-frequency setting part 103.

The spring constant-frequency setting part 103 stores a frequency setting map. As illustrated in a block in FIG. 3, the frequency setting map sets a relationship between the target spring constant K and a set frequency f, namely, an oscillation frequency required for the spring constant of the suspension bush 40 to reach the target spring constant K. The frequency setting map has such a characteristic that the set frequency f increases as the target spring constant K increases. The spring constant-frequency setting part 103 inputs the target spring constant K supplied from the vehicle speed-spring constant setting part 102, refers to the frequency setting map to calculate the set frequency f corresponding to the target spring constant K, and supplies the set frequency f, which is the calculation result, to the oscillation input calculation part 104.

It should be noted that the spring constant setting map and the frequency setting map can be arbitrarily set. For example, the spring constant setting map and the frequency setting map may be set from data acquired in advance by experiments for a suspension bush 40 greatly contributing to the change in the suspension characteristics out of the plurality of suspension bushes 40. Moreover, for example, the spring constant setting map and the frequency setting map may be set by considering a contribution degree representing a contribution to the change of the suspension characteristics on each of the suspension bushes 40. Moreover, such a configuration that the spring constant setting map and the frequency setting map may be joined, and the set frequency f is directly derived from the vehicle speed V may be provided. Moreover, the set frequency f may increase stepwise as the vehicle speed V increases. In this case, the number of stages for switching the set frequency f is only required to be at least two.

The oscillation input calculation part 104 inputs the set frequency f supplied from the spring constant-frequency setting part 103, and generates a signal representing an oscillation input Fv having a predetermined amplitude and oscillating at the set frequency f. For example, a triangle wave, a sinusoidal wave, a square wave, or the like oscillating about zero as a center may be adopted as the oscillation input Fv. Moreover, the amplitude of the oscillation input Fv is set so as to generate a minute oscillation having an amplitude of approximately 0.1 mm in the vehicle longitudinal direction at a ground surface of a tire T when the oscillation input Fv is superimposed on the target driving force F* as described later. The oscillation input calculation part 104 supplies a signal representing the generated oscillation input Fv to the superimposition part 105.

The superimposition part 105 inputs the target driving force F* supplied from the target driving force calculation part 101 and the oscillation input Fv supplied from the oscillation input calculation part 104, and uses the oscillation input Fv to correct the target driving force F*. In other words, the superimposition part 105 sets a value acquired by superimposing the oscillation input Fv on the target driving force F* to a final target driving force F* (F*=F*+Fv). Thus, the corrected target driving force F* includes the oscillation component at the set frequency f. The superimposition part 105 supplies the corrected target driving force F* to the drive control part 106.

The drive control part 106 converts the target driving force F* into a target motor torque T*, and outputs a drive command signal corresponding to the target motor torque T* to the motor driver 35. When the target motor torque T* represents a driving torque, a current flows from the motor driver 35 to the motor 30. When the target motor torque T* represents a braking torque, a current flows from the motor 30 via the motor driver 35 to the battery. The power running control or the regeneration control is applied to the motors 30 in this way, resulting in a driving force or a braking force generated on the respective wheels 10.

In this case, the driving force for the wheel 10 includes the oscillation component.

Therefore, as illustrated in FIG. 2, the minute oscillation in the vehicle longitudinal direction having the amplitude of approximately 0.1 mm is generated by the oscillation component on the ground surface of the tire T. The minute oscillation of the wheel 10 is transmitted to the casing of the motor 30 for supporting the wheel 10 for rotation, and is transmitted from the casing of the motor 30 via the suspension arm 21 to the suspension bushes 40. As a result, the suspension bushes 40 change in the characteristics, in other words, the spring constant and the damping coefficient increase.

In the first motor control example, the frequency of the oscillation to be applied to the suspension bush 40 is set to be higher as the vehicle speed V increases, and thus the spring constant (rigidity) of the suspension bush 40 increases. Moreover, the damping coefficient of the suspension bush 40 also increases. Thus, the suspension bushes 40 harden, resulting in an increase in operation stability during the high-speed travel. Moreover, the suspension bushes 40 soften, resulting in an increase in ride comfort during the low-speed travel.

Moreover, a resonance frequency of the vehicle body is changed by changing the spring constants of the suspension bushes 40. In general, a frequency of a vehicle body oscillation which the driver feels uncomfortable changes depending on the vehicle speed. Thus, in the first motor control example, the spring constant of the suspension bush 40 is changed depending on the vehicle speed V. In this manner, the resonance frequency of the vehicle body can be changed so as to be separated from the frequency band of the oscillation which the driver feels uncomfortable. As a result, the ride comfort can be increased.

Moreover, the minute oscillation in the longitudinal direction of the front wheel 10f is transmitted via the knuckle arm 31, the tie rod 55, and the rack bar 53 to the rack housing 57. As a result, the minute oscillation of the front wheel 10f is transmitted to the rubber bushes 58 provided on the rack housing 57. As a result, the characteristics of the rubber bush 58 can be changed, and the steering characteristic (the understeer or the oversteer) can be adjusted. In other words, the steering characteristic can be adjusted toward the understeer direction, resulting in an increase in the operation stability during the high-speed travel.

In this embodiment, a king pin axis (a straight line connecting between the ball joint 45 on the lower arm and the ball joint 45 on the upper arm in the suspension 200 of the front wheel 10f and a center axis in the vertical direction of the tire T are separated from each other by a predetermined distance (a distance so-called kingpin offset) in the vehicle lateral direction on the ground surface. Therefore, when the oscillation in the longitudinal direction is generated on the front wheel 10f, a moment of rotating the front wheel 10f about the vertical axis alternately forward and backward acts. In particular, the front coupling part 211, the motor coupling part 213, and the axle are provided at the same vehicle longitudinal position on the suspension 20f according to this embodiment, and thus the moment of rotating the front wheel 10f about a vertical line passing through a center of the front coupling part 211 alternately forward and backward acts. As a result, the oscillation generated by the motor 30 can be efficiently converted into the oscillation in the vehicle lateral direction, and can be transmitted to the steering apparatus 50. The steering apparatus 50 is of the steer-by-wire type, in which the rack-and-pinion mechanism 51 and a steering wheel (not shown) are not mechanically coupled to each other, and thus the oscillation is not transmitted to the steering wheel. Thus, the steering apparatus 50 does not give the driver the sense of discomfort.

The first embodiment described above provides the following effects.

1. The characteristics (spring constant and damping coefficient) of the suspension bush 40 can be changed by inputting a minute oscillation to the suspension bush 40, and controlling the frequency of the oscillation. Thus, the suspension characteristics can be adjusted by the simple configuration, resulting in the increases in the ride comfort and the operation stability.

2. The motors 30, the ECU 100, and the motor driver 35 originally included in the vehicle of the in-wheel motor type can be used to apply the oscillation at the desired frequency to each of the suspension bushes 40. Therefore, the characteristic of the suspension 20 can be easily changed during the travel without installing large-scale apparatus such as a suspension spring apparatus variable in spring constant and a shock absorber apparatus variable in damping coefficient. Thus, the embodiment can be carried out without causing an increase in cost and an increase in mass. Moreover, the amplitude of the oscillation generated on the wheel 10 is minute, and the oscillation of the wheel 10 is thus not felt by the driver.

3. The frequency of the oscillation applied to each of the suspension bushes 40 is set so as to increase as the vehicle speed V increases. Therefore, the operation stability increases during the high-speed travel, and the shock input from the wheel 10 is appropriately absorbed, resulting in the increase in ride comfort during the travel at the ordinary vehicle speed. Moreover, the resonance frequency of the vehicle body can be appropriately changed by the frequency control for the oscillation applied to the each of the suspension bushes 40, and hence the ride comfort relating to the oscillation can be particularly increased.

4. The oscillation generated by the motor 30 can be transmitted to the rubber bush 58 of the steering apparatus 50, and hence the steering characteristics (understeer and oversteer) can also be adjusted.

Second Motor Control Example

A description is now given of a second motor control example carried out by the ECU 100. FIG. 4 is a functional block diagram of the ECU 100 according to the second motor control example. Processing by respective functional parts is repeated at a predetermined short calculation cycle by the microcomputer of the ECU 100. It should be noted that the same functional parts as those in the first motor control example are denoted by the same reference symbols as those in the first motor control example, and a description thereof is omitted.

The ECU 100 includes the target driving force calculation part 101, an attitude change rate-damping coefficient setting part 112, a damping coefficient-frequency setting part 113, the oscillation input calculation part 104, the superimposition part 105, and the drive control part 106.

The attitude change rate-damping coefficient setting part 112 stores a damping coefficient setting map. As illustrated in a block in FIG. 4, the damping coefficient setting map sets a relationship between the magnitude |G| of an attitude change rate G of the vehicle body (hereinafter referred to as attitude change rate |G|) and a target damping coefficient C.

The damping coefficient setting map has such a characteristic that the target damping coefficient C increases as the attitude change rate |G| increases. The attitude change rate-damping coefficient setting part 112 inputs the attitude change rate G detected by the G sensor 74, refers to the damping coefficient setting map to calculate the target damping coefficient C corresponding to the attitude change rate |G|, and supplies the calculation result (target damping coefficient C) to the damping coefficient-frequency setting part 113.

The damping coefficient-frequency setting part 113 stores a frequency setting map. As illustrated in a block in FIG. 4, the frequency setting map sets a relationship between the target damping coefficient C and a set frequency f, namely, an oscillation frequency required for the damping coefficient of the suspension bush 40 to reach the target damping coefficient C. The frequency setting map has such a characteristic that the set frequency f increases as the target damping coefficient C increases. The damping coefficient-frequency setting part 113 inputs the target damping coefficient C supplied from the attitude change rate-damping coefficient setting part 112, refers to the frequency setting map to calculate the set frequency f corresponding to the target damping coefficient C, and supplies the set frequency f, which is the calculation result, to the oscillation input calculation part 104.

It should be noted that the damping coefficient setting map and the frequency setting map can be arbitrarily set. For example, the damping coefficient setting map and the frequency setting map may be set from data acquired in advance by experiments for a suspension bush 40 greatly contributing to the change in the suspension characteristics out of the plurality of suspension bushes 40. Moreover, for example, the damping coefficient setting map and the frequency setting map may be set by considering a contribution degree representing a contribution to the change of the suspension characteristics on each of the suspension bushes 40. Moreover, such a configuration that the damping coefficient setting map and the frequency setting map may be joined, and the set frequency f is directly derived from the attitude change rate |G| may be provided. Moreover, the set frequency f may increase stepwise as the attitude change rate |G| increases. In this case, the number of stages for switching the set frequency f is only required to be at least two.

The oscillation input calculation part 104 generates a signal representing an oscillation input Fv having a predetermined amplitude and oscillating at the set frequency f. The superimposition part 105 sets a value acquired by superimposing the oscillation input Fv on the target driving force F* to a new target driving force F* (F*=F*+Fv). The oscillation component at the frequency set depending on the attitude change rate |G| is added to the driving force for the wheel 10 in this way. The minute oscillation of the wheel 10 is transmitted to the casing of the motor 30, and is transmitted from the casing of the motor 30 via the suspension arm 21 to the suspension bushes 40. As a result, the suspension bushes 40 change in the characteristics, and the spring constant and the damping coefficient increase.

The frequency of the oscillation to be applied to the suspension bushes 40 is set to be higher, and the damping coefficient of the suspension bush 40 increases as the attitude change rate |G| increases in the second motor control example. Moreover, the spring constant of the suspension bush 40 increases. Thus, when the attitude of the vehicle body greatly changes, a sprung oscillation level (amplitude of the vehicle body oscillation) can be reduced. As a result, the attitude of the vehicle body can be quickly stabilized.

Moreover, when the attitude of the vehicle body does not greatly change, the damping coefficient of the suspension bush 40 can be reduced, resulting in an increase in ride comfort while an oscillation of the vehicle body at an appropriate degree is permitted.

For example, when the vehicle body is turning, when the vehicle body is vertically oscillating, when the vehicle body is rolling, or when the vehicle body is pitching, there is such a request as to quickly stabilize the attitude of the vehicle body. For this request, in the second embodiment, the attitude change rate G (such as the lateral acceleration, the vertical acceleration, the longitudinal acceleration, the yaw rate, the pitch rate, and the roll rate) is detected, and when the attitude change rate |G| is high, the set frequency is set to higher than that in the case of a low attitude change rate |G| to increase the damping coefficient of the suspension bush 40.

For example, when the lateral acceleration sensor or the yaw rate sensor is provided as the G sensor 74, the damping coefficient of each of the suspension bushes 40 can be increased for a stable turning travel during the turning travel of the vehicle. Moreover, when the vertical acceleration sensor for detecting the vertical acceleration of the vehicle body is provided as the G sensor 74, a vertical motion of the vehicle body can be appropriately damped. Moreover, when the pitch rate sensor is provided as the G sensor 74, the pitching of the vehicle body can be appropriately damped. Moreover, when the roll rate sensor is provided as the G sensor 74, the rolling of the vehicle body can be appropriately damped. Moreover, when a plurality of types of the G sensor 74 are provided, the attitude change rate |G| may be calculated by combining attitude change rates in a plurality of directions.

Moreover, a stroke speed is low in a minute stroke area where the shock absorber 22 starts stroking, and the oscillation reduction is thus difficult for the shock absorber 22, but the suspension bush 40 can respond well to the oscillation having the minute stroke. Thus, an oscillation damping operation of the shock absorber 22 can be assisted by changing the damping coefficient of the suspension bushes 40 depending on the attitude change rate.

Third Motor Control Example

A description is now given of a third motor control example carried out by the ECU 100. FIG. 5 is a functional block diagram of the ECU 100 according to the third motor control example. Processing by respective functional parts is repeated at a predetermined short calculation cycle by the microcomputer of the ECU 100. It should be noted that the same functional parts as those in the first motor control example are denoted by the same reference symbols as those in the first motor control example, and a description thereof is omitted.

The ECU 100 includes the target driving force calculation part 101, a vehicle speed and attitude change rate-frequency setting part 114, the oscillation input calculation part 104, the superimposition part 105, and the drive control part 106.

The vehicle speed and attitude change rate-frequency setting part 114 stores a frequency setting map. As illustrated in FIG. 6, the frequency setting map sets a relationship of deriving a set frequency f from a combination of the vehicle speed V and the attitude change rate |G|. The vehicle speed and attitude change rate-frequency setting part 114 inputs the vehicle speed V detected by the vehicle speed sensor 73 and the attitude change rate G detected by the G sensor 74, refers to the frequency setting map, calculates the set frequency f corresponding to the detected vehicle speed V and attitude change rate |G|, and supplies the set frequency f as the calculation result to the oscillation input calculation part 104. In this case, the various sensors described in the second motor control example may be used as the G sensor 74.

The set frequency f providing an optimal suspension characteristic brought about by the characteristic change of the suspension bush 40 for a combination of the vehicle speed V and the attitude change rate |G| is set by an experiment or the like in advance to the frequency setting map. In an example in FIG. 6, the vehicle speed V and the attitude change rate |G| are each divided into five levels, and the set frequency f is set depending on the 25 combinations, but the frequency setting map may take any form as long as the set frequency f is uniquely determined by the vehicle speed V and the attitude change rate |G|. For example, a function of the vehicle speed V and the attitude change rate |G| as parameters may be used. In this case, the frequency setting map has such a characteristic that the set frequency f increases as the vehicle speed V increases, and the set frequency f increases as the attitude change rate |G| increases. However, all the areas do not need to have such a characteristic, and an appropriate frequency is only required to be set in each of the areas.

The oscillation input calculation part 104 generates the signal representing the oscillation input Fv having a predetermined amplitude and oscillating at the set frequency f. The superimposition part 105 sets a value acquired by superimposing the oscillation input Fv on the target driving force F* to a new target driving force F* (F*=F*+Fv). The oscillation component at the frequency set depending on the vehicle speed V and the attitude change rate |G| is added to the driving force for the wheel 10 in this way. The minute oscillation of the wheel 10 is transmitted to the casing of the motor 30, and is transmitted from the casing of the motor 30 via the suspension arm 21 to the suspension bushes 40. As a result, the suspension bushes 40 change in the characteristics, and the spring constant and the damping coefficient increase.

The frequency of the oscillation to be applied to the suspension bush 40 is set to be high, resulting in the increases in the spring constant and the damping coefficient of the suspension bush 40 both in the case where the vehicle speed V is high, and in the case where the attitude change rate |G| is high in the third motor control example. Thus, the third motor control example can provide the actions and effects in the first and second motor control examples.

Second Embodiment

A description is now given of a vehicle according to a second embodiment of the present invention. FIG. 7 schematically illustrates a configuration of a vehicle 2 of the in-wheel motor driving type according to the second embodiment. Such a configuration that the driving force of the motor 30 is oscillated to input the oscillation to the suspension bushes 40 is employed according to the first embodiment, but an oscillation generation apparatus 200 in place of the motor 30 is used to input an oscillation to the suspension bushes 40 according to the second embodiment. Thus, the vehicle 2 according to the second embodiment is common to the vehicle 1 according to the first embodiment in the wheels 10, the suspensions 20, the motors 30, the motor driver 35, the steering apparatus 50, and the sensors 71 to 74. The vehicle 2 according to the second embodiment is different from the vehicle 1 according to the first embodiment in such a point that the oscillation generation apparatus 200 are provided, and an ECU 150 is provided in place of the ECU 100.

The oscillation generation apparatus 200 is only required to be arranged so as to apply the oscillation to arbitrary one (at least one) of the plurality of the suspension bushes 40. In the example illustrated in FIG. 7, the oscillation generation apparatus 200 are arranged in neighborhoods of the vehicle body coupling parts 214r of the suspensions 20r on the rear wheel side, and in neighborhoods of the rear coupling parts 212f of the suspensions 20f on the front wheel side to apply the oscillations to the vehicle body coupling parts 214r and the rear coupling parts 212f.

A description is now given of an oscillation generation apparatus 200r for applying an oscillation to the vehicle body coupling part 214r on the rear wheel side as an example of the oscillation generation apparatus 200. As illustrated in FIG. 8, the oscillation generation apparatus 200r includes a motor 201, a disk 202 fixed to an output shaft of the motor 201, a first arm 203, and a second arm 204.

The motor 201 is fixed to the vehicle body. One end of the first arm 203 is coupled for swinging via a coupling pin 205 to an outer peripheral portion of the disk 202, and the other end of the first arm 203 is coupled for swinging via a coupling pin 206 to one end of the second arm 204. The other end of the second arm 204 is coupled for swinging via a coupling pin 207 to the bracket 11, which is the vehicle body-side member for fixing the vehicle body coupling part 214r.

As a result of this configuration, when the motor 201 rotates, the coupling pin 205 carries out a turn motion about the motor output shaft, and the turn operation causes the first arm 203 and the second arm 204 to carry out a link motion while an angle between axial directions thereof is changed. As a result, a load acts from the coupling pin 207 on the bracket 11 at a cycle corresponding to the rotational speed of the motor 201. The bracket 11 is coupled to the inner cylinder 42 of the suspension bush 40. Therefore, the load acting on the bracket 11 is input as an oscillation to the inner cylinder 42 of the suspension bush 40.

The oscillation generation apparatus 200 is not limited to this configuration, and a widely-known oscillation generation apparatus 200 may be used. For example, the oscillation generation apparatus 200 may be such a type that an operation piece is moved forward and backward by an eccentric cam provided on the output shaft of the motor, and an oscillation is applied to the suspension bush 40 by the forward/backward motion of the operation piece, which is not shown. Moreover, the oscillation generation apparatus 200 may be configured to apply the oscillation to the outer cylinder 41 of the suspension bush 40.

A description is now given of a configuration of the ECU 150. FIG. 9 is a functional block diagram of the ECU 150. Processing by respective functional parts is repeated at a predetermined short calculation cycle by a microcomputer of the ECU 150. It should be noted that the same functional parts as those in the first embodiment are denoted by the same reference symbols as those in the first embodiment, and a description thereof is omitted.

The ECU 150 includes the target driving force calculation part 101, the drive control part 106, a frequency setting part 151, and a drive control part 152. The driving torque of the motor 30 does not need to be oscillated in the second embodiment. Thus, a drive system for the motor 30 includes the target driving force calculation part 101 and the drive control part 106. The drive control part 106 inputs the target driving force F* calculated by the target driving force calculation part 101, and outputs a drive command signal generated based on the target driving force F* to the motor driver 35.

The frequency setting part 151 inputs at least one of the vehicle speed V or the attitude change rate G, and calculates the set frequency f as in the first embodiment. The frequency setting part 151 may include the vehicle speed-spring constant setting part 102 and the spring constant-frequency setting part 103 in the first motor control example described in the first embodiment, may include the attitude change rate-damping coefficient setting part 112 and the damping coefficient-frequency setting part 113 in the second motor control example, or may include the vehicle speed and attitude change rate-frequency setting part 114 in the third motor control example. The frequency setting part 151 supplies the set frequency f to the drive control part 152.

The drive control part 152 provides drive control for the oscillation generation apparatus 200 so that the oscillation at the set frequency f is generated. For example, when the oscillation generation apparatus 200 is configured to use the motor 201 to generate the oscillation, the oscillation generation apparatus 200 controls the rotational speed of the motor 201. As a result, the oscillation generated by the oscillation generation apparatus 200 is transmitted to the suspension bush 40, thereby changing the spring constant and the damping coefficient of the suspension bush 40. Thus, the suspension characteristic is adjusted as in the first embodiment. Thus, such a simple configuration as to provide the oscillation generation apparatus 200 enables the adjustment of the suspension characteristic.

Moreover, while the first embodiment is configured so that the oscillation in the vehicle longitudinal direction is applied to the suspension bush 40, in the second embodiment, the direction of the oscillation to be applied to the suspension bush 40 can be arbitrarily set by the arrangement of the oscillation generation apparatus 200 or the like. The characteristics (spring constant and damping coefficient) of the suspension bush 40 greatly change in the direction of applying the oscillation. Thus, the suspension characteristic can be changed by means of the direction of applying the oscillation to the suspension bush 40.

Moreover, the oscillation input is not superimposed on the target driving force for the motor 30 according to the second embodiment, and the control for the motor 30 thus becomes simple.

The vehicle according to each of the embodiments is described above, but the present invention is not limited to the above-mentioned embodiments. Various modifications may be made thereto without departing from the gist of the present invention.

For example, the shock absorber 22 provided on the vehicle according to each of the embodiments is not the type variable in damping coefficient, but the type variable in damping coefficient may be employed. Even in this case, the damping force control for the shock absorber may be assisted by adjusting the damping coefficient of the suspension bush 40. The adjustment of the damping coefficient of the suspension bush 40 is effective particularly in the minute stroke area of the suspension 20.

Moreover, while a coil spring which is constant in the spring constant is used as the suspension spring 23 in each of the embodiments, a spring of a type variable in spring constant such as an air spring apparatus capable of adjusting the spring constant by means of an air supply amount may be employed. It is hard for the air spring apparatus to instantaneously change the spring constant, and hence ride comfort control by the air spring apparatus can be assisted by the adjustment of the spring constant of the suspension bush 40.

Moreover, a form of the suspension 20 can be arbitrarily set. Moreover, the configuration and the installation direction of the suspension bush 40 can also be arbitrarily set.

Moreover, while each of the embodiments has a configuration in which the oscillations are applied to the suspension bushes 40 for all the (four) wheels, for example, such a configuration that the oscillations are applied only to the suspension bushes 40 for the front wheels 10f or such a configuration that the oscillations are applied only to the suspension bushes 40 for the rear wheels 10r may be employed.

Moreover, while a description is given of the application to the vehicle (automobile) of the in-wheel motor driving type in each of the embodiments, vehicles to which the present invention can be applied are not limited to a vehicle of the in-wheel motor driving type. For example, the present invention can be applied to an automobile which travels by using an internal combustion engine, a hybrid vehicle which travels by using an internal combustion engine and motors, and an electric vehicle which travels by using motors provided on the vehicle body side.

REFERENCE SIGNS LIST 1, 2 . . . vehicle
10 . . . wheel
20 . . . suspension
21 . . . suspension arm
22 . . . shock absorber
23 . . . suspension spring
30 . . . motor
31 . . . knuckle arm
35 . . . motor driver
40 . . . suspension rubber bush
41 . . . outer cylinder
42 . . . inner cylinder
43 . . . rubber
50 . . . steering apparatus
58 . . . rubber bush
71 . . . accelerator sensor
72 . . . brake sensor
73 . . . vehicle speed sensor
74 . . . acceleration sensor
100, 150 . . . electronic control unit (ECU)
101 . . . target driving force calculation part
102 . . . vehicle speed-spring constant setting part
103 . . . spring constant-frequency setting part
104 . . . oscillation input calculation part
105 . . . superimposition part
106 . . . drive control part
112 . . . attitude change rate-damping coefficient setting part
113 . . . damping coefficient-frequency setting part
114 . . . vehicle speed and attitude change rate-frequency setting part
151 . . . frequency setting part
152 . . . drive control part
200 . . . oscillation generation apparatus
211f . . . front coupling part
212f . . . rear coupling part
213f . . . motor coupling part
214r . . . vehicle body coupling part
215r . . . upper motor coupling part
216r . . . lower motor coupling part
A . . . accelerator operation amount
B . . . brake operation amount
C . . . target damping coefficient
f . . . set frequency
F* . . . target driving force
Fv . . . oscillation input
G . . . attitude change rate
K . . . target spring constant
V . . . vehicle speed

What is claimed is:

1. A vehicle, comprising:
    travel state amount acquisition means comprising one or more sensors configured to acquire a travel state amount that is a state amount relating to a travel state of the vehicle;
    oscillation applying means comprising a motor configured to apply an oscillation for changing a characteristic of a suspension rubber bush to the suspension rubber bush;
    an ECU (electronic control unit) configured to:
        set, based on the travel state amount acquired by the travel state amount acquisition means, a frequency of the oscillation to be applied to the suspension rubber bush; and
        control an operation of the oscillation applying means so as to apply the oscillation at the frequency set by the ECU to the suspension rubber bush.

2. A vehicle according to claim 1, wherein:
    the motor is built into a wheel of the vehicle, for generating a driving force for rotating the wheel; and
    the ECU is configured to control the oscillation applying means to oscillate the driving force at the set frequency.

3. A vehicle according to claim 2, wherein the ECU is configured to:
    determine a target driving force for the motor depending on a driver operation amount;
    superimpose an oscillation component at the set frequency on the determined target driving force to determine a final target driving force; and
    control the driving force based on the final target driving force.

4. A vehicle according to claim 1, wherein:
    the travel state amount acquisition means acquires a vehicle speed as the travel state amount; and
    the ECU sets, when the vehicle speed is high, the frequency to a higher value than when the vehicle speed is low.

5. A vehicle according to claim 4, wherein the ECU sets, as the frequency, such a frequency that a spring constant of the suspension rubber bush is a target spring constant set depending on the vehicle speed.

6. A vehicle according to claim 1, wherein:
    the travel state amount acquisition means acquires an attitude change rate of a vehicle body of the vehicle as the travel state amount; and
    the ECU sets, when a magnitude of the attitude change rate is large, the frequency to a higher value than when the magnitude of the attitude change rate is small.

7. A vehicle according to claim 6, wherein the ECU sets, as the frequency, such a frequency that a damping coefficient of the suspension rubber bush is a target damping coefficient set depending on the attitude change rate of the vehicle body.

* * * * *